United States Patent
Melchinger et al.

(10) Patent No.: US 6,244,054 B1
(45) Date of Patent: Jun. 12, 2001

(54) METHOD FOR COOLING MATERIAL CHUNKS OR GRAINS AND DEVICE FOR CARRYING OUT SAID METHOD

(75) Inventors: Joerg Melchinger, Stuttgart; Ralf Jakob, Karlsbad; Michele Melchiorre, Blaustein; Joachim Pfitscher, Ulm, all of (DE)

(73) Assignee: DaimlerChrysler AG (DE)

(*) Notice: Subject to any disclaimer, the term of this patent is extended or adjusted under 35 U.S.C. 154(b) by 0 days.

(21) Appl. No.: 09/403,851
(22) PCT Filed: Apr. 2, 1998
(86) PCT No.: PCT/EP98/01923
  § 371 Date: Dec. 23, 1999
  § 102(e) Date: Dec. 23, 1999
(87) PCT Pub. No.: WO98/48064
  PCT Pub. Date: Oct. 29, 1998

(30) Foreign Application Priority Data

Apr. 23, 1997 (DE) .................................... 197 17 006

(51) Int. Cl.⁷ ........................... F25D 13/06; F25D 13/04; F25D 17/02
(52) U.S. Cl. ...................... 62/63; 62/65; 62/375; 62/374
(58) Field of Search ................. 62/63, 65, 373, 62/265, 322, 374

(56) References Cited

U.S. PATENT DOCUMENTS

| | | | |
|---|---|---|---|
| 2,519,148 | * 8/1950 | McShea | 62/63 |
| 4,090,369 | * 5/1978 | LeDiouron | 62/63 |
| 4,157,018 | * 6/1979 | Goltsos | 62/373 |
| 4,619,113 | * 10/1986 | Dubrulle et al. | 62/64 |
| 5,683,040 | * 11/1997 | Jakob et al. | 241/14 |

FOREIGN PATENT DOCUMENTS

| | | | |
|---|---|---|---|
| 1 778 559 | 4/1972 | (DE) . | |
| 26 13 298 | 10/1977 | (DE) | F25D/3/10 |
| 195 18 277 C1 | 5/1996 | (DE) | B29B/17/02 |
| 1 482 908 | 8/1977 | (GB) | B65G/3/08 |

OTHER PUBLICATIONS

Kryogen Verbundstofftrenung fur "echtes", Recycling, In: GAK, Nr. 1,1993, 46, Jg.

sieche restliche Entgegenhaltungen Literatur auf Anlage 1.

* cited by examiner

Primary Examiner—William Doerrler
(74) Attorney, Agent, or Firm—Pendorf & Cutliff

(57) ABSTRACT

A device for cooling material chunks or grains, especially material consisting of multiple components, which are subsequently fed to a device for crushing said material, preferably on a selective basis. An example is electronic waste material intended for recycling. According to the invention, the material is placed into a cooling tank in a discontinuous manner and in separate portions. In at least part of the cooling tank, the material is cooled by means of a liquefied gas having a low boiling point and then removed from the cooling tank in a discontinuous manner. The invention notably allows for the targeted setting of the optimal temperature for the selective crushing of the material in question while at the same time optimizing the required quantities of cooling gas and energy and minimizing both manual labor and processing time.

28 Claims, 1 Drawing Sheet

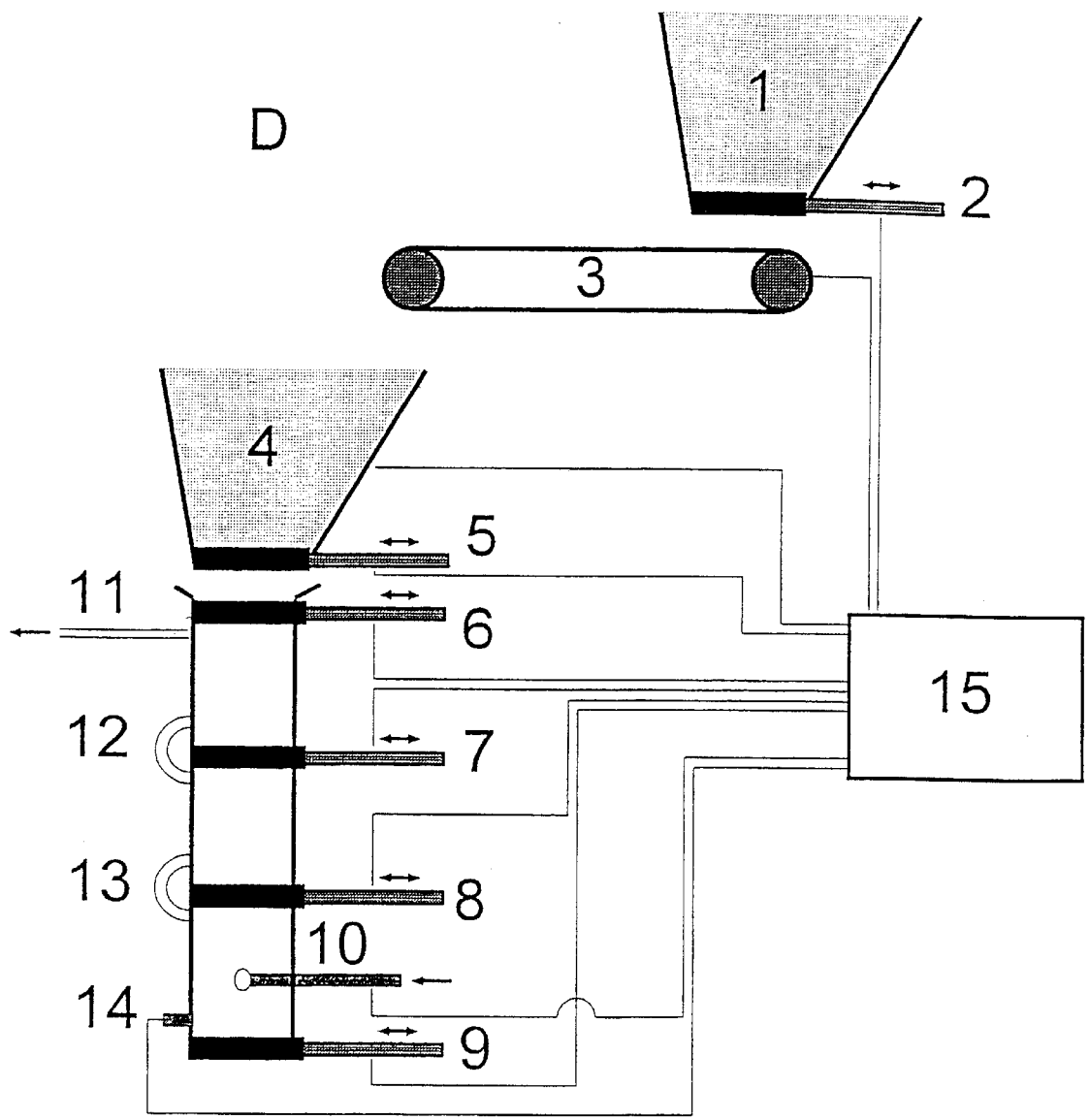

METHOD FOR COOLING MATERIAL CHUNKS OR GRAINS AND DEVICE FOR CARRYING OUT SAID METHOD

BACKGROUND OF THE INVENTION

Field of the Invention

The invention concerns a process for the cooling of chunky or granular materials. Such a process and device are generally known from D4304675A1.

Processes and devices of this type employ, for example, the embrittlement or rigidification of industrial products, which are to be subsequently broken down. In particular, the breaking down and grinding processes are facilitated by the rigidification of the products, and thereby the energy requirement for this type of process is minimized.

It has been found particularly advantageous to employ such a cooling in the breaking down of multi-component products such as, for example, electronic waste material. Electronic waste material is comprised of very diverse materials, in particular of metals and plastics, wherein frequently the later are at least partially subjected to halogenation for the purposes of fire-proofing. A recycling of this type of diverse material requires first the unlocking thereof, that is, a breaking down of the binder material. As a result of a strong cooling, for example to the temperature of liquid nitrogen, thermal tensions occur between the various materials, which simplify or facilitate their separation. On the other hand, the plastics become brittle while the metals such as, for example, copper or aluminum remain tough or tenacious, whereby a selective breaking down or fragmentation can be achieved. A third aspect thereof is that the cooling minimizes the production of dioxides and furans from the halogen-containing plastics and other halogenated components which would otherwise occur during the breaking down of electronic waste material following a strong warming of the material, which would damage the environment. The production of such environmentally damaging substances is substantially minimized or completely prevented in an inert gas atmosphere, for example, an atmosphere of vaporized nitrogen.

Known processes for the breaking down of multi-component articles such as, for example, expended batteries, are carried out in a continuous process and accordingly, very helpful processes or devices for cooling of the aggregate or joined materials to be broken down are likewise conceived for a continuous throughput of material and continuous operation (DE 43 04 675 A1, DE 41 06 599 A1). An experiment shows, however, that many multi-component composites, for example, electronic waste materials, can be selectively broken down (DE 195 18 277 C1). The plastic components of the electronic waste material are already strongly broken down after a short processing time, while the mostly metallic components have a substantially larger size (DE 195 18 277 C1). For recycling requirements, such a selective particle size reduction this is advantageous, since on the one hand, the necessary breaking apart between the various materials of the composite is achieved effectively, and on the other hand, the greater proportion of the metallic components are provided with a large particle measurement which is comparatively simple to separate. The selective breaking down requires, however, different from conventional processes, until achievement of a somewhat uniform particle size reduction of plastic and metallic components, a batch-type, that is, a discontinuous operation, in which the composite material is only subjected to the breaking down process for only a defined period of time and then with still strongly divergent differential particle size measurements is removed from the breaking down device. For the cooling devices of the proposed breaking down devices there is, economically speaking, in comparison to the conventional cooling devices, a batch-type operation just like the breaking down device, and thus discontinuous operation, thereby saving energy and cooling materials in comparison to the continuously operated cooling device, since cooling is not carried out beyond an optimal period of time.

Beyond this, consideration must be given to the strongly varying temperature dependencies of the breaking down process for the various composite materials. Therefrom there results on the one hand a requirement that for the carrying out of an adequately selective breaking down a homogenous-as-possible temperature distribution is desired within the particle mixture to be reduced in size of the various composite materials. Otherwise, it can occur, that various materials do not show the desired variation or differentiation in particle size reduction relationship, that is, a selective breaking down, but rather on the basis of the varying temperatures show a similar breaking down relationship and are broken down non-selectively. On the other hand, a non-homogenous temperature distribution within the particle mixture to be reduced in size for the various composite materials leads to an uneven separation of the various composite components, whereby a subsequent sorting or separation is substantially complicated.

A further essential criteria for the realization of a sufficiently selectivity in the reduction of a certain amount of composite materials is comprised therein that the total amount of the composite material is subjected for a common, defined period of time for the size reduction requirement. In order to make this possible, the entire amount of the composite material must be fed to the size reduction device at one period in time or at least within a short period of time. This requires, besides the discontinuous operation of the upstream cooling device, above all a discontinuous emptying out.

In DE-A-2550958 a process for recycling of expended materials is described, which includes a process step of cooling the expended materials, wherein the old material is discontinuously supplied in vats to a closed, isolated cooling chamber. In the cooling chamber the vats are over sprayed with a low boiling, liquefied gas until achievement of a predetermined temperature and in this manner are cooled. The temperature is measured outside the vats. No indication is given as to the design of the vats. After cooling the vats inclusive of the material to be recycled are removed from the cooling chamber and then the vats are emptied of their material to be broken down.

This process has numerous disadvantages: since the temperature is measured outside of the vats, in order to insure the attainment of a homogenous temperature distribution in the material being recycled this must be cooled for a significantly longer period of time than in the case of a direct temperature measurement within the material being recycled. This applies particularly, when closed vats are employed so that the cooling must occur through the walls. If on the other hand open vats are employed, then a large part of the fluidized gas is carried away during the removal from the cooling chamber. Beyond this it is also necessary that in addition to the material being recycled also the vat must be cooled, as a result of which the requirement for cooling medium increases unnecessarily. Besides this there is the energy requirement for the filling of the vats with the material being recycled, and further for the filling of the cooling chamber with the vats, as well also for the removal of the vats from the cooling chamber and for the transport of the vats to the breaking down device. Accordingly this process has a high requirement for time, energy and cooling media with small homogeneity of the temperature distribution in the material being recycled.

In GB-A-1482908 a device for the supply and cooling of granular material is described, which includes a cooling tank and a there above positioned wheel sloose for the filling thereof and the upper part of the cooling tank there is secured an indicator for the condition for filling. This serves to stop the feeding of material via the wheel sloose as soon as a fill level indicated thereby is achieved. In the lower part of the cooling tank there is provided one or more inlets for a low boiling, liquefied gas. No details are given regarding the carrying out of the process in this cooling device.

This device exhibits a number of disadvantages: it indicates two conceiveable possibilities for the carrying out of the process which this cooling device. Either via the wheel sloose and the fill indicator a determined (preset) amount of the granular material supplied and thereafter is cooled. Alternatively the cooling occurs already, while material is still be introduced via the wheel sloose. In the first case the time requirement is comparatively high. In the second care the duration of the cooling of the material, which is introduced first, is longer. Therefrom there results an inhomogeneous temperature distribution or a higher time requirement until achievement of a uniform temperature distribution. In general an inhomogeneous temperature distribution is more likely to be expected, since the lower boiling liquefied gas or the supply for the low boiling liquefied gas is situated in the lower part of the cooling tank and this is filled up to the upper part of a level-sensor. Beyond this, this device can only inadequately respond to the demands of various materials (composites, coating thicknesses, insulation value, etc.) or subsequent processes (breaking down processes, desired particle sizes, degree of unlocking, etc.), since the fill amount of the cooling device is predetermined by a level sensor.

SUMMARY OF THE INVENTION

The task of the present invention is comprised therein, of providing a process, with which chunks or grains of material can be cooled as homogeneously as possible with the smallest possible expenditure of energy, time, and cooling medium, and further of providing a device, with which this intended process can be carried out with the smallest amount of constructive expenditure.

The task is inventively solved with respect to the process thereby, that
  a) the chunks or grains of material are discontinuously introduced into a cooling tank and
  b) dosed and
  c) in at least one part of the cooling tank for at least some period of time are cooled with the aid of a low boiling, liquefied gas, whereby
  d) the dosing and cooling of the chunks or grains of material occurs separated spatially but parallel timewise, and
  e) the dosing of the amount of the chunks or grains of material to be introduced is freely programmable by a control device, and
  f) the cooling occurs with the aid of one or more low-boiling, liquefied gasses.

This arrangement in accordance with the invention exhibits the following advantages with respect to the state of the art:

The spatial separation of dosing and cooling makes possible their temporal parallel processing in such a manner, that respectively a defined amount of the chunks or grains of material can be dosed and then be introduced into the cooling tank. There this dose is cooled, while in the dosing or measuring device a further dose is already being collected. By means of this process, the throughput of the cooling tank can be substantially increased as compared to a process in which the dosing and cooling is carried out sequentially.

The freely adjustable dosing of the amount of chunks or grains of material to be supplied by means of the control device makes possible an optimal adaptation of the size thereof to the requirement of the various materials (composite materials, coating thickness, thermal conductivity, etc.) or follow-up processes (grinding processes, desired particle size, degree of breaking apart, etc.)

As a result of the ability to select between one or more low-boiling, fluidized gases, for the cooling of the chunks or grains of material the cooing process can be further optimized with respect to the requirements of the material to be cooled and the follow-up processes, since various gasses have different characteristics for the cooling of a particular material to a particular temperature (physically, economically, ecologically) and in this mode and manner the individual steps of a multi-step cooling can be optimized.

Suitable measurements of the amount can, for example, be by weight or volume. The value of these units lies in the simplicity of their determination. The determination of the weight is above all advantageous for applications, in which the chunks or grains of material during the filling of the dosing device tend to form bridges and therewith lead to erroneous determinations during determination of the volume.

In a further advantageous embodiment of the invention, the chunks or grains of material are transported within the cooling tank solely on the basis of their gravitational pull acting at least partially in the direction of the transport. The advantage of such an embodiment lies in the complete dispensing of supplemental conveyance means within the cooling tank.

Within the cooling tank, the chunks or grains of material pass through multiple separable chambers and are advantageously pre-cooled in one or more of the chambers on the inlet side of the cooling chamber by means of a vaporized low-boiling cooling gas, and are preferably cooled in one or more of the chambers on the outlet side of the cooling tank to the desired output temperature by means of a liquefied low-boiling cooling gas. For a particularly advantageous embodiment of the invention, the portion of the liquefied low-boiling cooling gas vaporized during the cooling from the chambers at the output side of the cooling tank is conveyed to the chambers at the input side of the cooling tank and employed for the pre-cooling of the chunks or grains of material. The advantage of this embodiment is comprised on the one hand in the drastic reduction in the required amount of cooling medium. On the other hand, it makes possible a multi-step cooling of the chunks or grains of material in comparison to a one-step cooling, which makes possible the adjustment of a homogenous temperature distribution within the dose of material. A homogenous temperature distribution within the dose of material is particularly advantageous for the selective size reduction or breaking apart.

With respect to the cooling of the electronic waste material, as suitable preparation for the selective size reduction thereof, nitrogen has proven itself to be a particularly advantageous low-boiling cooling gas. When the liquefied nitrogen has extracted its heat of vaporization out of the electronic waste material, then the gaseous nitrogen is still in condition, until reaching room temperature, to extract again more than the same amount of thermal energy.

In an advantageous further development of the invention, a dose of the chunks or grains of material is cooled in at least one part of the cooling tank with the aid of a second, supplemental low-boiling liquefied gas. The advantage of this type of further development is comprised therein, that various gases are variously suitable (physically, economically, ecologically) for cooling to a particular temperature and in this mode and manner the individual steps of a multi-step cooling can be optimized.

A further particularly advantageous embodiment of the process is comprised therein, that the output temperature can be optimized and adjusted with respect to the type of the chunks or grains of material, for which the actual temperature of the materials is continuously measured in the proximity of the outlet opening of the cooling tank and liquefied cooling gas is introduced until the difference between the actual and the set value of the material temperature is less than a freely adjustable optimal minimal value, and only then is the cooling tank outlet opened. This arrangement makes possible the optimization of the energy and cooling medium consumption to a necessary but however minimal value.

The above-mentioned task is, with respect to the device, inventively solved thereby, that the device for cooling of chunks or grains of material comprises a) a dosing device,
b) a cooling tank, with an at least partially vertical orientation,
c) both of which are adapted for receiving the chunks or grains of material, wherein
   a) the dosing device and the cooling tank are spatially separated from each other,
   b) and the device further comprises a control device for the freely adjustable dosing of the amount of the chunks or grains of material to be introduced,
   c) and one or more supply conduits for one or more low-boiling, liquefied gases.

This set of device characteristics is characterized by it's good functionality with respect to the carrying out of the desired cooling process and by it's particularly simple construction.

In an advantageous embodiment of this device, the above-mentioned dosing device incorporates a weighing device, wherein the latter is preferably connected with an electronic control device, and this control device automatically regulates the filling of the dosing device with the chunks or grains of material up to achievement of a freely pre-selected weight. The advantage of this arrangement lies in its simple construction and manner of operation as well as in the minimization of the necessary manual operation.

Preferably, the mentioned dosing device is positioned or provided directly above the inlet opening of the cooling tank but without mechanical contact. Otherwise, the function of the weighing device could be influenced by mechanical interference, which could occur during the operation of the cooling tank.

In a further advantageous embodiment of this device, the above-mentioned dosing device incorporates a measuring device for determining the volume of waste material, wherein the volume measuring device is preferably designed or constructed as an indicator for the condition of filling, and is electronically connected with a control device, and this control device automatically regulates the filling of the dosing device with the chunks or grains of material up to achievement of a freely pre-selected volume. The advantage of this embodiment lies likewise in its simple construction and manner of operation as well as in the minimization of the necessary amount of manual servicing.

The two last-mentioned advantageous embodiments of the inventive device make possible in particular the time and energy optimizing operation of a device for reducing or breaking down of multi-component composites, for example of electronic refuse, with a simultaneously minimized requirement for manual work.

Further advantageous characteristics of the embodiments of the above-mentioned devices are comprised therein, that the cooling tank at its inlet and its outlet opening is provided with closure means such as gates or locks, wherein the gates are preferably constructed as sliders, of which the advance and extraction occurs automatically and is electronically controllable; as well as that the construction material at least over a part of the cooling tank walls possesses a minimal thermal conductivity comparable to a thermal insulation or at least a part of the cooling tank wall is provided with a supplemental thermal insulation, wherein the concept "cooling tank wall" also includes the gates used for introduction and removal. The advantage of this embodiment lies in the, constructively considered, particularly simple achievement of the requirements of the set inventive task, and particularly with respect with the discontinuity of the cooling.

Further advantageous construction or design characteristics of the mentioned device are comprised therein, that the cooling tank possesses a quadratic or right-angled cross section as well as one or more sliders, which makes possible the division or compartmentalization of the cooling tank into multiple, separate chambers, in which the introduction and extraction of sliders occurs automatically and is electronically controllable, wherein the control both of the compartmentalization as well as the above-mentioned sliders occurs pneumatically, hydraulically, magnetically, or electronically by means of step motors. The advantages of this embodiment flow on the one hand from the simplified construction and controlling as well on the other hand from the uniform enlargement of the flow-through of the cooling tank cross section during the extraction of the slider and the therewith corresponding uniform acceleration and interference-free transport of the raw material between sequential chambers, or as the case may be, out of the cooling tank outlet.

Further advantageous characteristics or features of the embodiment of the above-described device are comprised on the one hand therein, that in one or more of the chambers on the outlet side of the cooling tank respectively one or more conduits are located for introduction of the fluidized cooling gas and respectively one temperature sensor, as well as an outlet opening for the cooling gas which vaporized during the cooling, which via a conduit is introduced into the next higher situated chamber without liquid gas cooling and there in the form of a vaporized cooling gas achieves an effect, as well as on the other hand therein, that in one or more of the chambers on the introduction side of the cooling tank respectively and in the lower area of the chamber is located an inlet for introduction of the vaporized cooling gas as well as in the upper area an outlet opening, which leads to a inlet in the next higher chamber, or, in the case of the upper-most chamber, serves as an expansion opening. The advantage of this arrangement is comprised in the minimization of the cooling gas consumption.

A particularly advantageous arrangement characteristic of the described device is comprised therein, that the temperature sensor(s), the inlets for the liquid cooling gas, and the automatic operable sliders as well as the dosing devices are connected with each other via an electronic control unit, which regulates the introduced amount and introduction time of the liquefied cooling gas and the introduction amount and introduction time of the waste material as well as the opening and closing times of the sliders depending upon the pre-selected set output temperature of the waste material. The advantage of this arrangement is comprised in the optimization of the energy and cooling gas requirement with simultaneous minimization of the requirement for manual operation.

BRIEF DESCRIPTION OF THE DRAWING

In the following, an exemplary embodiment of the inventive process and an exemplary arrangement of the inventive device will be described in greater detail on the basis of the FIGURE.

The FIGURE shows schematically a suitable device for the cooling of chunks or grains of material, comprised of a) a dosing device D, and b) a cooling tank K, with an at least partially vertical orientation, c) both of which are adapted for receiving the chunks or grains of material, wherein d) the dosing device D and the cooling tank K are spatially separated from each other, e) the device further comprises a control device 15 for the freely adjustable dosing of the amount of the chunks or grains of material to be introduced, and f) one or more supply conduits 10 for one or more low-boiling, liquefied gases.

DETAILED DESCRIPTION OF THE INVENTION

The dosing device D is comprised of a collection container 1, which can be closed by means of a slider 2, wherein the opening and closing of the same occurs automatically and is regulated by an electronic control device 15, as well as a conveyor belt 3, of which the conveyance speed is likewise regulated by the control device 15, as well as a weighing device 4, which likewise is electronically connected with the control device 15 and which can be closed via a slider 5, wherein the opening or closing thereof occurs automatically, hydraulically, and is electronically controlled via the control device 15.

The dosing device D, in particular the weighing device, is not in mechanical contact with the cooling tank K.

By means of this electronically regulated dosing device D, there is at a process-optimized point in time a process optimized amount of waste material introduced into the cooling tank K. For this, the slider 5 permits the conveyor belt 3 to transport waste material until achievement of the process optimal loading of the weighing device 4 with waste material, and then to stop the conveyor as well as to open the slider 5 upon attainment of the process optimal point in time.

The dosing of a process optimal amount of waste material in the dosing device D occurs temporally parallel to the pre-cooling and cooling of other process optimal amounts in the cooling tank K. The amount of time saved, in comparison to a process which is carried out sequentially time-wise, is employed for a (in the following, described in greater detail) multi-step cooling. This makes possible a high through-put for the device with a simultaneously high homogeneity of the temperature distribution within the waste material discharged from the cooling tank K.

The cooling tank K is oriented vertically, it has a right angled or quadratic cross section and at its waste material inlet opening has a sliding gate 6 and at its waste material outlet a sliding gate 9, as well as two further sliders 7 and 8, which are all operated automatically, hydraulically for opening and closing, and are controlled electronically via the control device 15. In the following, the reference to the inlet and outlet side will be by reference to the path of the waste material within the cooling tank K. In the cooling tank chamber formed by the sliders 8 and 9, there is a centrally oriented inlet 10 for the nitrogen liquid cooling gas as well as, positioned on the outlet side on the cooling tank wall, a temperature sensor 14, as well as, positioned on the inlet side on the cooling tank wall, an outlet opening for the nitrogen vaporized during the cooling, which communicates via the conduit 13 with the outlet side in the wall of the chamber between the sliders 7 and 8. In this chamber, there is likewise positioned on the inlet side an outlet opening for the nitrogen, which communicates via conduit 12 with the outlet side in the wall of the chamber between the sliders 6 and 7. In this chamber, there can be found likewise positioned on the inlet side an outlet opening 11 for the nitrogen. The temperature sensor 14 and the nitrogen supply conduit 13 are electronically connected with the control device 15, wherein the later regulates the introduction amount and time of the nitrogen and optimally adapts to the process requirements.

A process optimal amount of waste material is introduced into the upper chamber of the cooling tank K and then it is, at spaced apart time intervals, introduced further into the thereunder situated chambers. In the chamber on the outlet side, liquid nitrogen is introduced for cooling. The introduction amount and introduction time is regulated via the control device 15 in such a manner that the waste material achieves a process optimal temperature at a process optimal point in time. For this, the actual temperature determined by a temperature sensor 14 is continuously compared with the intended or set temperature.

After the start-up of the process, all chambers of the cooling tank K are respectively filled with a process optimal amount of the waste material. This applies for each separate point in time, with the exception of the following described material transport.

The material transport occurs discontinuously, in that the regulating device 15 causes the outlet slider 9 to open the outlet chamber at a process optimal point in time, whereby the waste material is discharged or emptied with the process optimal temperature. Thereafter, the regulating device 15 causes the output slider 9 to close and to open the slider 8, whereby the waste material falls out of this chamber into the output chamber. This process repeats itself appropriately with the introduction or feed chamber, and the thereunder situation chamber as well as with the dosing device D and the inlet chamber or feed chamber. The filing of the dosing device D occurs during the cooling of a previous charge of the waste material.

The cooling of the waste material occurs discontinuously and step-wise. In the upper most chamber of the cooling tank K, cooling to a temperature below the ambient temperature occurs with the relatively warm, gaseous nitrogen, in the thereunder situated chamber further cooling occurs with colder, gaseous nitrogen, and in the outlet chamber, cooling to the set or desired temperature occurs with very cold liquefied nitrogen. Therein, the nitrogen vaporized in the outlet chamber is conveyed via conduits 13 and 14 into the respectively higher chambers and employed for pre-cooling as well as conveyed via the outlet opening 11 out of the cooling tank K. The various steps of the cooling occur time-wise parallel in the various chambers of the cooling tank K and respectively to a different process optimal amount of the waste material. A multi-step cooling of the waste material in this manner makes possible, in comparison to the one-step cooling, a significant improvement in the homogeneity of the temperature distribution within the waste material discharged from the outlet opening 11 of the cooling tank K. The increased amount of time required therefore is re-captured by a time-wise parallel running of waste material dosing and cooling.

The inventive process inclusive device shows itself in the illustrated embodiment as particularly suitable for the necessary cooling of electronic waste material prior to the selective breaking down thereof.

The invention is not limited to the above-described illustrative embodiment, but rather envisions to various embodiments.

So it can, for example, be envisioned that instead of the cooling gas being nitrogen, carbon dioxide is employed as the cooling gas, or also halogen-free, low-boiling hydrocarbons, for example, methane, ethane, or propane, or also cyclopropane, propylene or the like, as well as mixtures thereof.

Further it is possible, that the amounts of the chunks or grains of material, for example, with a material with sufficiently large dimensions, are not determined by the weight or the volume of the material, but rather directly via the piece-counts. In one such case, the dosing device could preferably be provided with an optical recognition device.

Finally, it is envisioned that as the gates on the introduction and the outlet openings of the cooling tank and/or for the distribution of the cooling tank in individual chambers no sliders are employed, but rather flaps, of which the opening and closing occurs automatically and preferably is controlled electronically.

LITERATURE (1) DE 43 04 675 A1
(2) DE 41 06 599 A1
(3) DE 195 18 277 C1
(4) DE-A-2550958
(5) GB-A-1482908

What is claimed is:

1. Process for cooling chunks or grains of material, comprising
   (a) discontinuously supplying the chunks or grains of material,
   (b) dosing and
   (c) cooling the dosed chunks or grains of material in at least one part of the cooling tank (K) with the aid of one or more low-boiling, liquefied gases, wherein
      steps (b) and (c) occur spatially separated from each other and time-wise parallel, and
      the dosing of the amount of the chunks or grains of material to be introduced is freely selectable via a control device (15).

2. Process according to claim 1, wherein the amount of the chunks or grains of material is determined by its weight.

3. Process according to claim 1, wherein the amount of the chunks or grains of material is determined by its volume.

4. Process for cooling chunks or grains of material, comprising
   (a) discontinuously supplying the chunks or grains of material,
   (b) dosing, wherein the dosing of the amount of the chunks or grains of material to be introduced is freely selectable via a control device (15), and
   (c) cooling the chunks or grains of material in at least one part of the cooling tank (K) with the aid of low-boiling, liquefied gases, wherein
      steps (b) and (c) occur spatially separated from each other and time-wise parallel, and
      wherein the chunks or grains of material pass through various separate chambers within the cooling tank (K), and in one or more of the chambers are pre-cooled at the introduction side of the cooling tank (K) by means of a previously vaporized cooling gas.

5. Process according to claim 4, wherein the chunks or grains of material are cooled in one or more of the chambers on the output side of the cooling chamber (K) by means of a second liquid low-boiling cooling gas.

6. Process according to claim 4, wherein the portion of the liquefied, low-boiling cooling gas vaporized during cooling is employed for the pre-cooling of the chunks or grains of material in one or more of the chambers at the introduction side of the cooling tank (K).

7. Process according to claim 1, wherein nitrogen is employed as the liquefied, low-boiling gas.

8. Process for cooling chunks or grains of material, comprising
   (a) discontinuously supplying the chunks or grains of material,
   (b) dosing and
   (c) cooling the chunks or grains of material in at least one part of the cooling tank (K) with the aid of low-boiling, liquefied gases, wherein
      steps (b) and (c) occur spatially separated from each other and time-wise parallel,
      the dosing of the amount of the chunks or grains of material to be introduced is freely selectable via a control device (15), and
      the output temperature of the chunks or grains of material is regulated, for which the actual temperature of the material is continuously measured in the area of the outlet opening of the cooling tank (K) and liquefied cooling as is introduced until the difference between the actual and set value of the material temperature differs by a pre-determined minimal value, and only then is the cooling tank outlet opened.

9. Process according to claim 8, wherein the set temperature of the chunks or grains of material to be discharged can be freely selected and adjusted within the physical limitations of the employed cooling gas or the employed cooling gases.

10. Device for cooling of chunks or grains of material, comprised of
   a) a dosing device (D),
   b) a cooling tank (K), with an at least partially vertical orientation,
   c) both of which are adapted for receiving the chunks or grains of material, wherein,
   d) the dosing device (D) and the cooling tank (K) are spatially separated from each other,
   e) the device further comprises a control device (15) for the freely adjustable dosing in the dosing device of the amount of the chunks or grains of material to be introduced into the cooing tank, and f) one or more supply conduits (10) for one or more low-boiling, liquefied gases.

11. Device according to claim 10, wherein the dosing device (D) includes a weighing device (4).

12. Device according to claim 11, wherein
   the weighing device (4) is electronically connected with a control device (15), and
   this control device (15) automatically regulates the filling of the dosing device (D) with the chunks or grains of material to be cooled up to achievement of a freely predetermined threshold value of the filling condition of the weight.

13. Device according to claim 11, wherein the weighing device includes a funnel shaped collection container which is provided without mechanical contact above the inlet opening of the cooling tank (K).

14. Device according to claim 10, wherein the dosing device (D) includes a measuring device for measuring the volume of the bulk material.

15. Device according to claim 14, wherein the volume measuring device is constructed as an indicator of fill condition and is electronically connected with a control device (15), and that this control device (15) automatically regulates the filling of the dosing device (D) with the chunks or grains of material up to achievement of a freely predetermined threshold value of the filling condition or the volume.

16. Device according to claim 10, wherein, that the cooling tank (K) is provided on its introduction and on its outlet opening with gates or closure means (6,9).

17. Device for cooling of chunks or grains of material, comprised of
   a dosing device (D),
   a control device (15) for the freely adjustable dosing of the amount of the chunks or grains of material to be introduced,
   a cooling tank (K), with an at least partially vertical orientation, having an introduction opening and an outlet opening, and provided on its introduction and on its outlet opening with gates (6,9) constructed as sliders, of which the sliding in and out occurs automatically, and
   one or more supply conduits (10) for supplying one or more low-boiling, liquefied gases to the cooling tank (K),
   wherein both the dosing device (D) and the cooling tank (K) are adapted for receiving the chunks or grains of material, and wherein the dosing device (D) and the cooling tank (K) are spatially separated from each other.

18. Device according to claim 10, wherein the construction material of at least a part of the cooling tank wall, and/or the gates (6,9) at the introduction and output openings of the cooling tank (K), posses a low thermal conductivity comparable to a thermal insulation, and/or, the gates (6,9) at the introduction and outlet openings of the cooling tank (K) are supplementally provided with thermal insulation.

19. Device for cooling of chunks or grains of material, comprised of
   a) a dosing device (D),
   b) a cooling tank (K), with an at least partially vertical orientation, wherein the cooling tank (K) exhibits a quadrilateral cross section as well as one or more sliders (7,8) in such a manner that the cooling tank is divided into multiple separate chambers, and wherein the introduction or withdrawal of the sliders (7,8) occurs automatically
   c) both of which are adapted for receiving the chunks or grains of material, wherein,
   d) the dosing device (D) and the cooling tank (K) are spatially separated from each other,
   e) the device further comprises a control device (15) for the freely adjustable dosing of the amount of the chunks or grains of material to be introduced, and
   f) one or more supply conduits (10) for one or more low-boiling, liquefied gases.

20. Device according to claim 17, the movement of the sliders (7,8) occurs electronically via a step motor or pneumatically or hydraulically or magnetically.

21. Device according to claim 19, wherein in one or more of the chambers at the outlet side of the cooling tank (K) respectively one or more inlets (10) are provided for introduction of the liquefied cooling gas and respective temperature sensors (14), as well as an outlet for the cooling gas which vaporizes during cooling, which is conveyed via a conduit (12,13) into the next higher situated chamber without liquid gas cooling and there in the form of a vaporized cooling gas achieves a pre-cooling effect.

22. Device according to claim 19, wherein in one or more of the chambers at the introduction side of the cooling tank (K) respectively is situated, in the lower area of the chamber, a conduit for introduction of the vaporized cooling gas, as well as an outlet opening in the upper area, which via a conduit (12,13) leads to the next higher chamber, or in the case of the uppermost chamber serves as a vent or expansion opening (11).

23. Device according to claim 21, wherein the temperature sensor(s) (14), the conduits (10) for the liquid cooling gas and the automatically advancable and withdrawable sliders (2,5–9) as well as the dosing device (D) are connected with each other via an electronic control device (15), which controls the amount and time of introduction of the liquefied cooling gas and the introduction amount and time of the waste material as well as the opening and closing times of the sliders (2,5–9), depending upon the pre-selected set output temperature of the waste material.

24. Device according to claim 17, wherein the sliding in and out the gates (6,9) is controlled electronically.

25. Device according to claim 10, wherein the introduction or withdrawal of the sliders (7,8) is controlled electronically.

26. Process as in claim 1, wherein said cooling is with the aid of two or more different low-boiling, liquefied gasses.

27. Device according to claim 10, comprising two or more supply conduits (10) for supplying two or more different low-boiling, liquefied gases to the cooling tank (K).

28. Device as in claim 10, wherein said cooling tank is a vertical cooling tower.

* * * * *